Patented Sept. 6, 1938

2,128,919

UNITED STATES PATENT OFFICE 2,128,919

TREATMENT OF FRUITS, PARTICULARLY DATES

Frank B. Doyle, Phillipsburg, N. J., assignor to Guardite Corporation, a corporation of Illinois No Drawing. Application September 11, 1937, Serial No. 163,497

9 Claims. (Cl. 99—100)

This invention relates to the treatment of fruits, and more particularly to the treatment of agglomerated dates, to separate and moisten them.

In the packaging of dates, the material is generally received from the market in wooden boxes, containing around seventy-five pounds of dates. The individual dates are jammed together and owing to their sugary consistency, they stick together and are very difficult to separate.

It has now been discovered that if the wooden box is broken down and the agglomerated mass allowed to stand in the resulting block and are then subjected to a high vacuum, followed by a steam treatment, the dates fall apart very nicely and at the same time are properly moistened to stay apart and permit easier packing.

Preferably the dates are subjected to a vacuum sufficiently high that water contained in the dates will boil at atmospheric temperature, and the evacuation is continued until the temperature has been lowered several degrees. Thereafter, steam is introduced at an elevated temperature and at an increased pressure to moisten the dates.

For example, dates having a temperature of approximately 90° F. were subjected to a vacuum sufficiently high to reduce the temperature of the dates to about 84° F. by boiling of contained moisture. The absolute pressure during this treatment will reach approximately .15 inch of mercury. Thereafter, steam is introduced to raise their temperature to approximately 116° F. The addition of the steam added about 3% of moisture to the dates, the moisture being uniformly distributed therethrough and increasing markedly the quality of the material.

In carrying out the operation, it is preferred not to keep the dates above a temperature of approximately 125° for any length of time. Therefore, if it is desired to sterilize the dates, the temperature is carried only momentarily to a higher point, followed by evacuation to reduce the temperature.

The invention is applicable not only for dates but for other sugary fruits.

It is preferred to evacuate the chamber with considerable rapidity. For example, it is preferred that an absolute pressure of one inch be reached within about five minutes.

In many cases, particularly with cool dates, it may be desirable to carry out several sequences of evacuation and steaming in order to raise the vapor pressure of the dates.

It is possible that the success of the process is in part due to the fact that the vapor pressure of water in the skins of the dates or other fruit is materially lighter than that in the pulp of the fruit, so that boiling takes place first at the skins and assists in separation of the individual fruit pieces.

As an example of the invention, a box full of Sair dates, having a temperature of 91° F., was removed from the box and subjected to an absolute pressure of approximately .25 inch until its temperature had dropped to 87° F. and then was steamed to produce a temperature of 123° F. The block of dates fell apart nicely and gained approximately 3½% of moisture.

The foregoing detailed description has been given for clearness only, and no unnecessary limitations should be understood therefrom, but the appended claims should be construed as broadly as permissible in view of the prior art.

I claim:

1. The method of treating an agglomerated mass of dates which comprises subjecting the unconfined agglomerated mass to a high vacuum, whereby the mass separates into individual dates.

2. The method as set forth in claim 1 in which the absolute pressure is less than .5 inch for a temperature of 90° F. in the dates.

3. The method as set forth in claim 1 in which the vacuum is low enough to cause boiling of contained moisture in the dates.

4. The method of treating sugary fruits to separate an agglomerated mass into individual pieces of fruit, which comprises subjecting an unconfined agglomerated mass to an absolute pressure of the order of .5 inch or less.

5. The method as set forth in claim 4, in which the pressure is low enough to boil contained moisture within the fruit.

6. The method of treating unconfined agglomerated fruit which comprises evacuating to an absolute pressure of the order of ½ inch or less, and then introducing steam thereto to raise the pressure and temperature and then separating the individual pieces of fruit.

7. The method as set forth in claim 6, in which the pressure is low enough to boil contained moisture.

8. The method of treating an unconfined agglomerated sugary mass of fruit, which comprises subjecting the mass to a high vacuum and then introducing steam to the mass to increase its temperature and moisture content.

9. The method of treating dates which comprises subjecting a mass of unconfined agglomerated dates to a vacuum sufficiently high to lower the temperature of the dates by evaporation of contained moisture, then admitting steam to the dates to raise its temperature and increase their moisture content, whereby the individual dates are separated.

FRANK B. DOYLE.